US012673602B2

(12) United States Patent　　　　(10) Patent No.:　US 12,673,602 B2

Badman et al.　　　　　　　　　　　(45) **Date of Patent:　*Jul. 7, 2026**

(54) ACTUATOR AND LIFT SYSTEM FOR A CAMPER TRAILER

(71) Applicant: JACKA INDUSTRIES PTY LTD, Winmalee (AU)

(72) Inventors: Stuart Badman, Winmalee (AU); Malcolm Badman, Winmalee (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,939

(22) Filed: Apr. 16, 2024

(65) Prior Publication Data

US 2024/0262278 A1　　Aug. 8, 2024

Related U.S. Application Data

(63) Continuation of application No. 17/636,305, filed as application No. PCT/AU2020/050867 on Aug. 20, 2020, now Pat. No. 11,981,246.

(30) Foreign Application Priority Data

Aug. 23, 2019　(AU) ................................. 2019903079

(51) Int. Cl.
*B60P 3/34*　　　　(2006.01)

(52) U.S. Cl.
CPC ................................... *B60P 3/341* (2013.01)

(58) Field of Classification Search
CPC ..... B60P 3/341; B60P 3/34; B60P 3/42; B60J 7/1614; B60J 7/165; B62D 63/061; B62D 63/08; B66F 3/08

USPC ....... 296/156, 164, 165, 168, 171, 172, 173, 296/175, 176, 26.01, 26.04, 26.05
See application file for complete search history.

(56) References Cited

U.S. PATENT DOCUMENTS

| | | | | |
|---|---|---|---|---|
| 3,053,562 A | * | 9/1962 | Farber | B60J 7/165 296/26.05 |
| 3,314,715 A | | 4/1967 | Bontrager | |
| 3,495,866 A | | 2/1970 | Bontrager | |
| 3,507,535 A | | 4/1970 | Wallace | |
| 3,508,782 A | * | 4/1970 | Corl | B60P 3/34 296/173 |
| 3,516,708 A | * | 6/1970 | Cox | B60P 3/341 296/170 |
| 3,519,306 A | * | 7/1970 | Young | B60P 3/341 D12/104 |

(Continued)

FOREIGN PATENT DOCUMENTS

| | | | | |
|---|---|---|---|---|
| AU | 2008261419 B2 | * | 8/2012 | .......... H02H 7/0851 |
| AU | 2015100908 A4 | | 8/2015 | |

(Continued)

*Primary Examiner* — Amy R Weisberg
*Assistant Examiner* — Veronica M Condo
(74) *Attorney, Agent, or Firm* — Schlee IP International, PC; Alexander R. Schlee; Pascal A. Schlee

(57) ABSTRACT

An actuator for a lift system for a roof of a camper trailer and a lift system and a camper trailer including the actuator. The actuator has a linear guide; a rotatable threaded shaft that extends in alignment with the guide; and a slider, located in the guide, and threadably mounted to the shaft. The slider is prohibited from substantial rotation within the guide, about an elongate axis thereof, such that, on rotation of the shaft, the slider moves along the shaft.

12 Claims, 10 Drawing Sheets

FIG. 5

(56) References Cited

U.S. PATENT DOCUMENTS

| | | | | |
|---|---|---|---|---|
| 3,674,305 A * | 7/1972 | Steury | B60P 3/34 | |
| | | | 296/156 | |
| 3,885,826 A | 5/1975 | Kropf | | |
| 4,171,843 A * | 10/1979 | Steury | B60P 3/34 | |
| | | | 296/156 | |
| 5,769,485 A | 6/1998 | Bontrager et al. | | |
| 6,345,854 B1 | 2/2002 | Mcmanus | | |
| 6,981,729 B2 * | 1/2006 | Steury | B60P 3/34 | |
| | | | 296/173 | |
| 7,090,286 B1 * | 8/2006 | Foreth | B60P 3/341 | |
| | | | 296/26.06 | |
| 7,246,843 B2 * | 7/2007 | Lambright | B60P 3/341 | |
| | | | 296/26.05 | |
| 10,046,628 B1 * | 8/2018 | Fulton | B60P 3/42 | |
| 11,981,246 B2 * | 5/2024 | Badman | B60P 3/341 | |
| 2001/0030446 A1 | 10/2001 | Lambright | | |
| 2002/0125736 A1 | 9/2002 | Messano | | |
| 2002/0140252 A1 | 10/2002 | Neville | | |
| 2008/0001490 A1 * | 1/2008 | Ketteler | H02K 7/06 | |
| | | | 310/83 | |
| 2008/0084089 A1 | 4/2008 | Hanson | | |
| 2012/0035813 A1 | 2/2012 | Kreil | | |
| 2012/0150394 A1 * | 6/2012 | Schwindaman | B60P 3/34 | |
| | | | 296/26.04 | |
| 2018/0072278 A1 * | 3/2018 | Righetti | B66F 3/16 | |

FOREIGN PATENT DOCUMENTS

| | | |
|---|---|---|
| CA | 2285769 A1 | 2/2001 |
| CN | 204138278 U | 2/2015 |
| CN | 107554399 A | 1/2018 |
| CN | 207374084 U | 5/2018 |
| CN | 108995577 A | 12/2018 |
| EP | 1275546 A2 | 1/2003 |
| NL | 1042457 B1 | 1/2019 |
| WO | 2017042575 A1 | 3/2017 |

* cited by examiner

To Screen 8                     Back To Screen 3

Screen 8

Operation Page
Indication of
FAULT event on
corner

Back to Screen 3

Main Home Page.
Access achieved by the User at
any time Pressing the "BACK"
button on the Operation page.
User now chooses the next
function.

ACTUATOR AND LIFT SYSTEM FOR A CAMPER TRAILER

CROSS-REFERENCE TO RELATED APPLICATIONS

This application is a continuation application of U.S. patent application Ser. No. 17/636,305, filed Feb. 17, 2022, which is a national phase entry based on the International Patent Application PCT/AU2020/050867 filed on Aug. 20, 2020 that claims the priority of the Australian patent application 2019903079 filed on Aug. 23, 2019. The content of all aforementioned patent applications is herewith incorporated by reference.

FIELD OF THE INVENTION

The present invention relates to actuators and lift systems for raising and lowering a roof of a camper trailer.

BACKGROUND OF THE INVENTION

Camper trailers are popular for camping as the camper trailer is based on a compact trailer that may be easily towed by a family car, four-wheel drive vehicle, utility "ute" or pick-up truck for example. The camper trailer is usually self-contained for sleeping arrangements, often includes a small kitchen and other conveniences.

There are various known arrangements and constructions for camper trailers. In the following description of the art, the detailed description and the claims camper trailers as shown and described in U.S. Pat. Nos. 3,314,715, 3,495,866, 3,507,535 and 5,769,485 are referred to by way of example.

FIG. 1 is a schematic of a perspective view of a common, prior art camper trailer 110 in a collapsed, travelling configuration. The camper trailer 110 has a base trailer 112 with two wheels 114 (one shown) and a draw or tow bar 116. The tow bar 116 may have a hitch or tow ball 118 to couple with the towing vehicle. The metal side of the trailer base 112 may have door 120. The camper trailer 110 also has a hard, substantially metal roof 122 resting on the base 112 (in other forms the roof may be fibreglass or gel coated timber). The roof 122 is usually secured to the base 112 during travelling using securing clips 124. The travelling height 126 of the collapsed camper trailer 110 is typically substantially lower than the height of the towing vehicle such that rear vision mirror is often useable.

FIG. 2 shows the roof 122 being raised of the prior art camper trailer 110 of FIG. 1. Fabric, vinyl and/or flexible plastic walls 214 unfold from the trailer base 112 as the roof 122 is raised on four telescopic posts 216. Cable lift systems as shown in U.S. Pat. Nos. 3,314,715, 3,495,866, 3,507,535 and 5,769,485 may be used to raise the roof 122 by use of a hand crank.

FIG. 3 shows the camper trailer 110 of FIGS. 1 and 2 when the roof 122 is fully raised and supported by the telescopic posts 216. A raised height 314 is typically in the range of 300 mm to 1400 mm. Generally, there is sufficient height within the camper trailer to stand erect and walk about. The weight of a camper trailer roof 122 may be in the range of about 100 kg to 300 kg. Other optional items, like air conditioners, roll-out awnings, weather screens or solar cell panels, may contribute additional weight to the roof Cable lift systems for a camper trailer roof 122 have enjoyed commercial success for many years but have a number of shortcomings. For example, the cables used may over time be prone to: tangling together, fraying, snagging and/or binding. Maintenance and repair of such cable systems may be difficult due to the cable arrangement being across the whole base 112 of the camper trailer and may be located behind cabinets, beds, storage units and the like, as exemplified in the above referenced patents.

Furthermore automation or powering of such cable lift systems may involve external electric motors being attached to the hand crank. Due to the high torque requirements readily portable electric motors such as a power drill or a winch motor are often large, have high power requirements and/or are noisy in operation, all of which are inconvenient and disturbing in a tranquil camping setting, particularly for late night setting up. Furthermore, the cables and pulleys are typically points of weakness, and there is a high incidence of damage when using powerful electric winches. For example, these systems are particularly susceptible to operator error, and irreversible damage occurring before the operator realises, such as, for example, with the winch continuing to operate when the roof is snagged.

Other actuator or lift systems are often not suitable for use in camper trailers as a stroke, the difference between an extended length and a closed or retracted length, of the actuator is insufficient for the raising height 314 necessary for a camper trailer. In addition the cost and the weight of a camper trailer is another significant factor in the choice of components for roof lift systems. For family camper trailers, with towing by a family vehicle, cost and weight of the trailer are significant to their commercial success. Higher cost specialised actuator components with comparatively heavier weights to, for example, a cable lift system may make the overall camper trailer unattractive. In use at a camping site a camper trailer is ideally self-contained without the need for auxiliary equipment necessary for pneumatic and hydraulic lift or actuator systems. If the lift system is to be incorporated in a camper trailer then a compact system is preferable so that it does not occupy significant space within the camper trailer and is easy to access for maintenance or replacement purposes if required.

Camper trailers 110, also otherwise termed Popup Campers, have different requirements and constructions to tent trailers and pop-top caravans.

Tent trailers are typically based on a box trailer towed by a vehicle. A tent is installed in the box trailer in order to be folded out from the trailer and erected with poles, pegs and ropes in the usual tent fashion. A heavy metal roof is not used for tent trailers.

Pop-Top Caravans are typically composite walled and roofed caravans which are towed by a vehicle. The pop-top roof of such caravans is typically only raised by about 200 to 500 mm to increase the ceiling height of the caravan. Accordingly the stroke length requirements for a pop-top caravan are far less demanding than for a camper trailer.

None of these prior art apparatus or methods provides an entirely satisfactory solution to the provision and operation of a lift system for the roof of a camper trailer, nor to the ease of construction or retrofitting to existing camper trailers.

Any reference herein to known prior art does not, unless the contrary indication appears, constitute an admission that such prior art is commonly known by those skilled in the art to which the invention relates, at the priority date of this application.

SUMMARY OF THE INVENTION

The present invention aims to provide an alternative arrangement and method for raising and lowering the roof of a camper trailer which overcomes or ameliorates the disadvantages of the prior art, or at least provides a useful choice.

In one broad for, the present invention provides, an actuator including: a linear guide; a rotatable threaded shaft that extends in alignment with the guide; and a slider, located in the guide, and threadably mounted to the shaft; wherein the slider is prohibited from substantial rotation within the guide, about an elongate axis thereof, such that, on rotation of the shaft, the slider moves along the shaft.

In one form, the linear guide is a tube. In one form, the tube has a rectangular cross section. In one form, the slider engages with an internal portion of the guide to prohibit substantial rotation therein. In one form, the slider is substantially block shaped. In one form, the slider is substantially rectangular prism shaped. In one form, the ratio of slider length to shaft length is 1:X, where X is in the range of 13 to 14 inclusive.

In one form, threaded engagement between the slider and shaft is self-locking, such that, in the absence of rotation of the shaft, the slider maintains its position along the length of the guide.

In one form, the shaft thread is a trapezoidal thread.

In one form the actuator includes a motor coupled to the shaft, to rotate the shaft.

In one form the actuator including a flexible pushrod located for contacting engagement with a distal end of the slider. In one form, the flexible pushrod is a helical spring which sleeves the shaft.

In one form, the actuator includes a curved guide extending from a distal end of the linear guide, the flexible pushrod extending therein. In one form, a telescopic post extends from a distal end of the curved guide, and the flexible pushrod operatively engages the telescopic post to drive extension thereof.

In a further broad form, the present invention provides a lift system for a roof of a camper trailer, including: at least one actuator according to any one of the above described or a combination of the above described forms, each actuator for operative engagement with a respective roof support that extends/retracts to raise/lower the roof; at least one control unit for controlling the at least one actuator.

In one form, the at least one control unit is configured to detect, based on feedback from the one or more actuators, whether an obstacle is limiting movement of the roof, and, if an obstacle is detected, the control unit stops the actuators.

In one form, the at least one control unit is configured to detect, based on feedback from the one or more actuators, whether an obstacle is limiting movement of the roof, and, if an obstacle is detected, the control unit controls the actuators to move the roof in the opposite direction to when the obstacle was detected.

In one form, wherein each roof support is a telescopic post.

In a further broad form, the present invention provides an actuator assembly for operative engagement with a roof support of a camper trailer, the actuator assembly including: a linear guide portion; a rotatable threaded shaft that extends in alignment with the linear guide portion; a motor coupled to the shaft, to rotate the shaft; a slider located in the linear guide portion, and threadably mounted to the shaft, the slider prohibited from substantial rotation within the guide such that on rotation of the shaft, the slider moves along the shaft; a flexible pushrod in the form of a helical spring that sleeves the shaft and is located thereon for contacting engagement with a distal end of the slider; and a curved guide portion extending from a distal end of the linear guide portion, the curved guide portion for receiving and redirecting the flexible pushrod to engage the roof support.

In a further broad form, the present invention provides a lift system for a roof of a camper trailer, including: a plurality of actuator assemblies, each actuator assembly for operative engagement with a respective roof support that extends/retracts to raise/lower the roof; at least one control unit for controlling the actuators. In one form, the actuator assemblies are as described above.

In one form, the actuator assemblies are independently operable.

In a further broad form the present invention provides a camper trailer including a lift system as described in any one of the above forms.

BRIEF DESCRIPTION OF THE DRAWINGS

The description is made with reference to the accompanying drawings, of which.

DETAILED DESCRIPTION OF THE DRAWINGS

Figure 1:
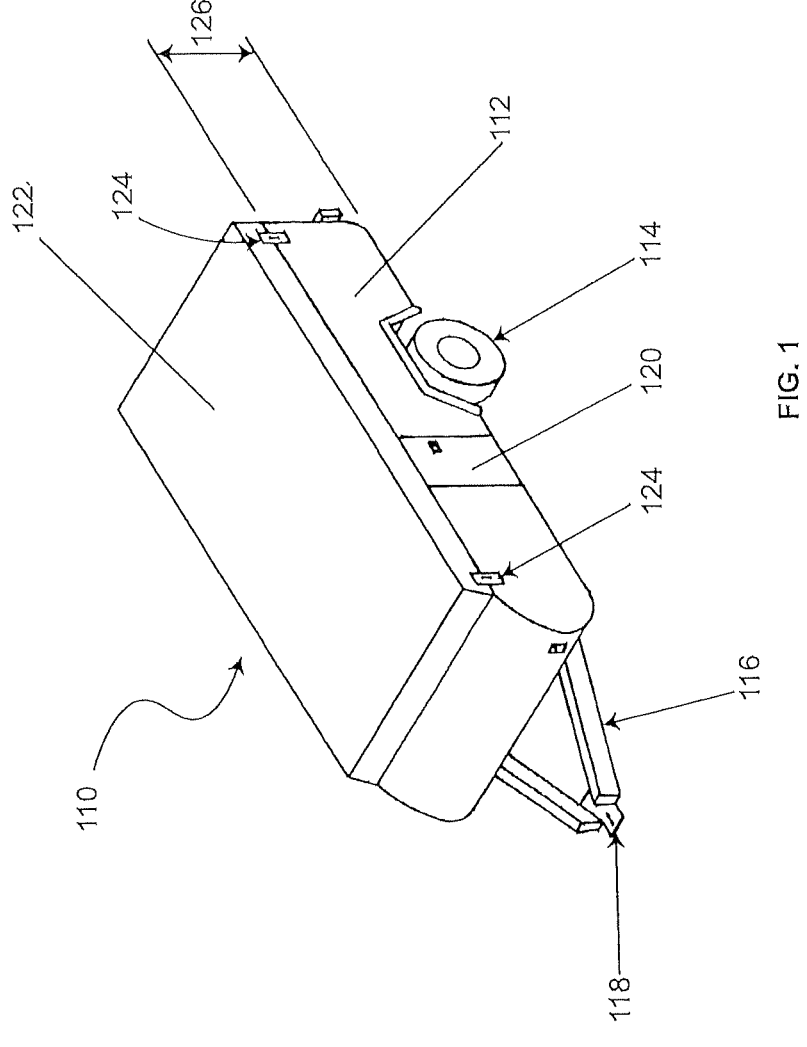
FIG. 1 is a schematic of a perspective view of one example of a common, prior art camper trailer in a collapsed, travelling configuration.
Figure 2:
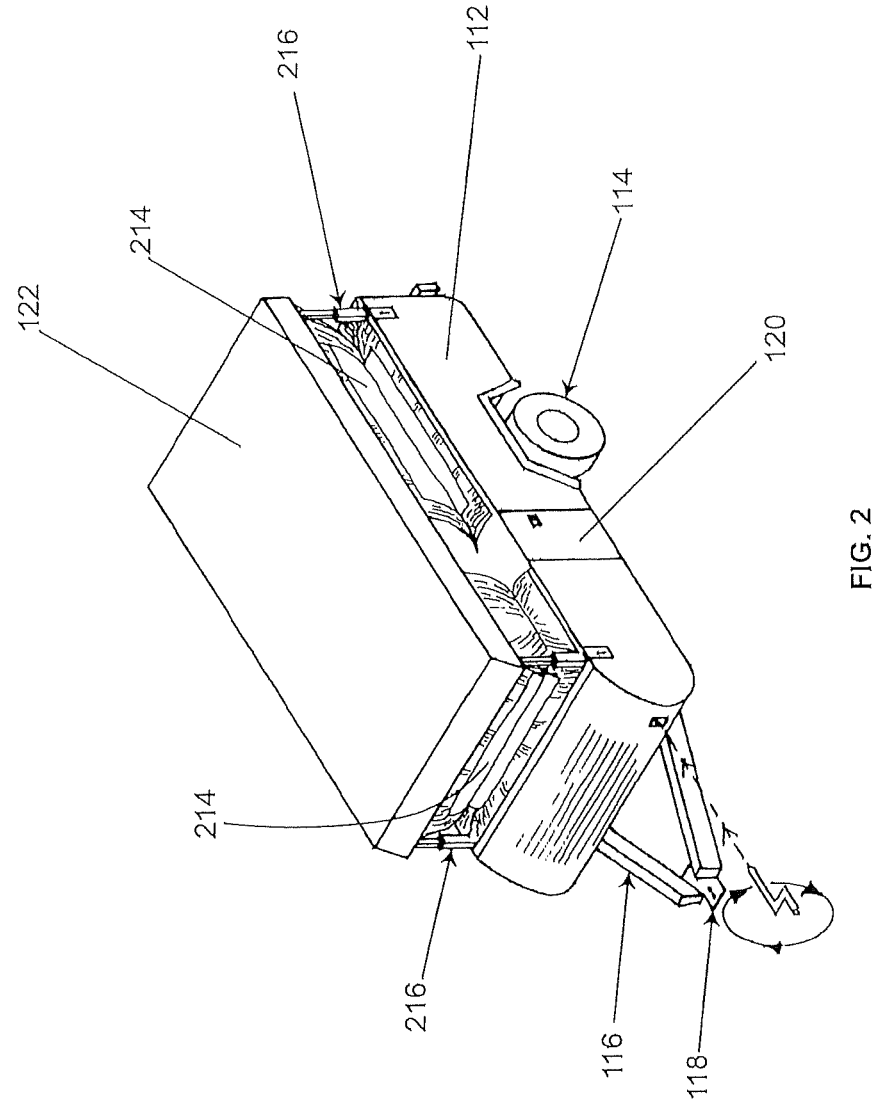
FIG. 2 is a schematic of a perspective view of the trailer of FIG. 1, with roof partially raised.
Figure 3:
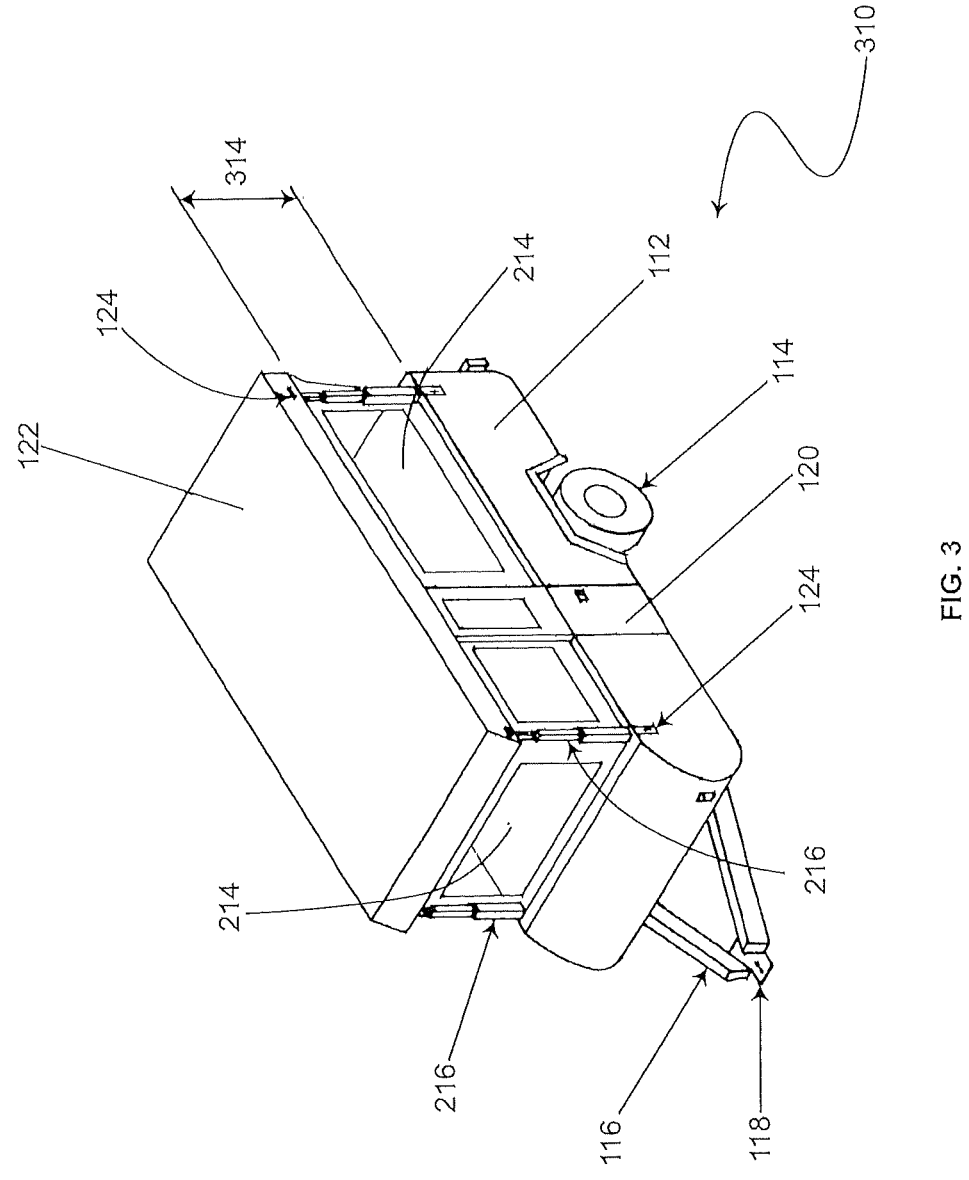
FIG. 3 is a schematic of a perspective view of the trailer of FIG. 1, with roof fully raised.

Embodiments of the present invention provide actuators or actuator assemblies that are typically for use in lift systems for camper trailer roofs. It will be appreciated that the actuators/actuator assemblies may be part of a lift system or may be retrofitted to an existing lift system. For example, the actuators/actuator assemblies as described herein may include or may by located in operative engagement with roof supports/telescopic posts of the roof of a camper trailer.

The actuators/actuator assemblies typically have a lead screw like mechanism. For example, the actuators include a linear guide and a rotatable threaded shaft that extends in alignment with the guide. A slider, located in the guide, is threadably mounted to the shaft. The slider is prohibited from substantial rotation within the guide, about an elongate axis thereof, such that, on rotation of the shaft, the slider moves along the shaft. Thus, with rotation of the shaft in a one rotation direction, the slider moves along the shaft in a first sliding direction, and with rotation of the shaft in the opposite rotation direction, the slider move along the shaft in a second sliding direction, opposite the first sliding direction. Typically, a motor is coupled to the shaft, to rotate the shaft. It will be appreciated that, in some forms, the motor may be considered part of the actuator/actuator assembly. It will also be appreciated that, there may be variation in where the motor is coupled to the shaft (i.e. which end, or at some point along the length etc.)

The linear guide may take a variety of forms but is generally a tube, and typically a tube with a square/rectangular cross section. It will be appreciated that the slider can take a variety of shapes provided rotation thereof about the elongate axis of the guide is limited. Generally, the slider is shaped/sized to correspond with or fit the internal dimensions of the guide. For example, when the guide is a square/rectangular tube, the slider is substantially block shaped or has the shape of a substantially rectangular prism.

It will be appreciated that the slider is thus generally shaped/sized to engage with an internal portion of the linear guide to prohibit rotation therein (i.e. about the elongate axis of the guide), but also to permit sliding travel along the guide. With the linear guide as an enclosed tube, it will be appreciated that debris and/or other obstacles are prevented from interfering with the path of the slider along the guide.

The blocked shaped nature of the slider, and in particular, the length thereof (i.e. length along the shaft) and fitting engagement within the linear guide (e.g. tube), may provide significant advantages to stroke length of the actuator. When compared to a narrower/shorter drive nut for example, it is possible to implement longer shaft lengths without buckling of the shaft occurring. In some examples, the ratio of slider length to shaft length is 1:X where X is in the range of 10 to 15 inclusive, and preferably between 12 to 14 inclusive, and even more preferably between 13 to 14 inclusive. In one preferred example, the ratio of slider length to shaft length is about 1:13.25. If a higher ratio, such as 1:20 is used, the threaded shaft may become less stable and there is a higher risk of buckling. Also, the braking action that supports the roof when raised is significantly decreased. On the other hand, if a lower ratio is used, such as 1:9, the increased length of the slider block requires an increase in the length of the threaded shaft. This exacerbates the above problems and makes installation unwieldy in a very confined space (in particular when retro fitting).

Threaded engagement between the slider and shaft is typically self-locking, such that, in the absence of rotation of the shaft, the slider maintains its position along the length of the guide. This provides advantages in that, when used to raise/lower the roof of a camper trailer, no additional brakes or support struts need to be implemented. In one example, the shaft thread is a trapezoidal thread.

The actuator/actuator assembly may include, or may be located to contact, a flexible pushrod. Typically, a flexible pushrod is located for contacting engagement with a distal side of the slider (i.e. opposite the motor side). The flexible pushrod may be a helical spring which sleeves the shaft at the distal side of the slider. Generally, in use in a camper trailer lift system, the flexible pushrod/helical spring is fed through a curved guide to operatively engage telescopic support posts that support the roof to be raised/lowered. For example, the linear guides/shafts may be located in a substantially horizontal orientation, at the base of a trailer, whilst the roof supports/telescopic posts are substantially vertically oriented to raise/lower the roof. The curved guide and flexible pushrod allow force to be transmitted from the horizontally aligned linear guide and slider to the vertically aligned support posts to drive extension thereof. In most instances, the flexible pushrod is not secured to the slider, but rather, the weight of the roof maintains same in contact with the slider. This provides that, if the roof encounters an obstacle on retraction (e.g. is snagged on a tree), the slider is still able to retract, preventing damage to the motor/actuator.

It will be appreciated that the actuator/actuator assembly, in some forms, may include varying parts as is required for installation/retrofitting to a camper trailer. For example, in some forms the actuator/actuator assembly may be considered as an extended unit that includes the curved guide and/or push rod and/or roof support/telescopic post.

Embodiments of invention also provide a lift system for a roof of a camper trailer, including at least one actuator/actuator assembly, and at least one control unit for controlling the at least one actuator/actuator assembly. Typically, in such lift systems, each actuator is for operative engagement with a respective roof support that extends/retracts to raise/lower the roof. Typically the lift systems are for retrofitting to an existing camper trailer, which may have existing support posts, curved guides and/or helical springs/flexible pushrods. However, as previously noted, different forms actuators/actuator assemblies, with varying parts, may be introduced as required, and in some instances, support posts curved guides and/or helical springs/flexible pushrods may be included.

The control unit typically includes any electronic processing system/circuity capable of sending/processing/receiving electrical signals to/from the actuators/actuator assemblies to control their operation. For example, the control unit may include microcomputer, microcontroller or the like. In one example, the at least one control unit is configured to detect, based on feedback from the one or more actuators/actuator assemblies, whether an obstacle is limiting movement of the roof, and, if an obstacle is detected, the control unit stops the actuator/actuator assemblies. In another example, is an obstacle is detected, the control unit controls the actuators/actuator assemblies to move the roof in the opposite direction to when the obstacle was detected. This provides that the lift system is prevented from damage, if, for example, the roof becomes snagged in a tree or if, for example, a user forgets to unlatch the safety latches that secure the roof to the trailer in the collapsed travel ready form.

The actuators/actuator assemblies are also typically independently operable. This provides that, in the case of malfunction of one of the actuators/actuator assemblies, the lift system can still operate with those actuators/actuator assemblies that are functioning to elevate/retract the roof.

It will be appreciated that whilst the presently described lift systems are typically implemented with the actuators/actuator assemblies as described herein other actuators may be used (i.e. the control unit may be configured to connected with actuators/actuator assemblies of a different type to provide operating advantages of the lift systems as describe herein).

It will also be appreciated that the present invention may also be embodied as a camper trailer or the like that includes lift systems and/or actuators/actuator assemblies as described herein.

Figure 4:
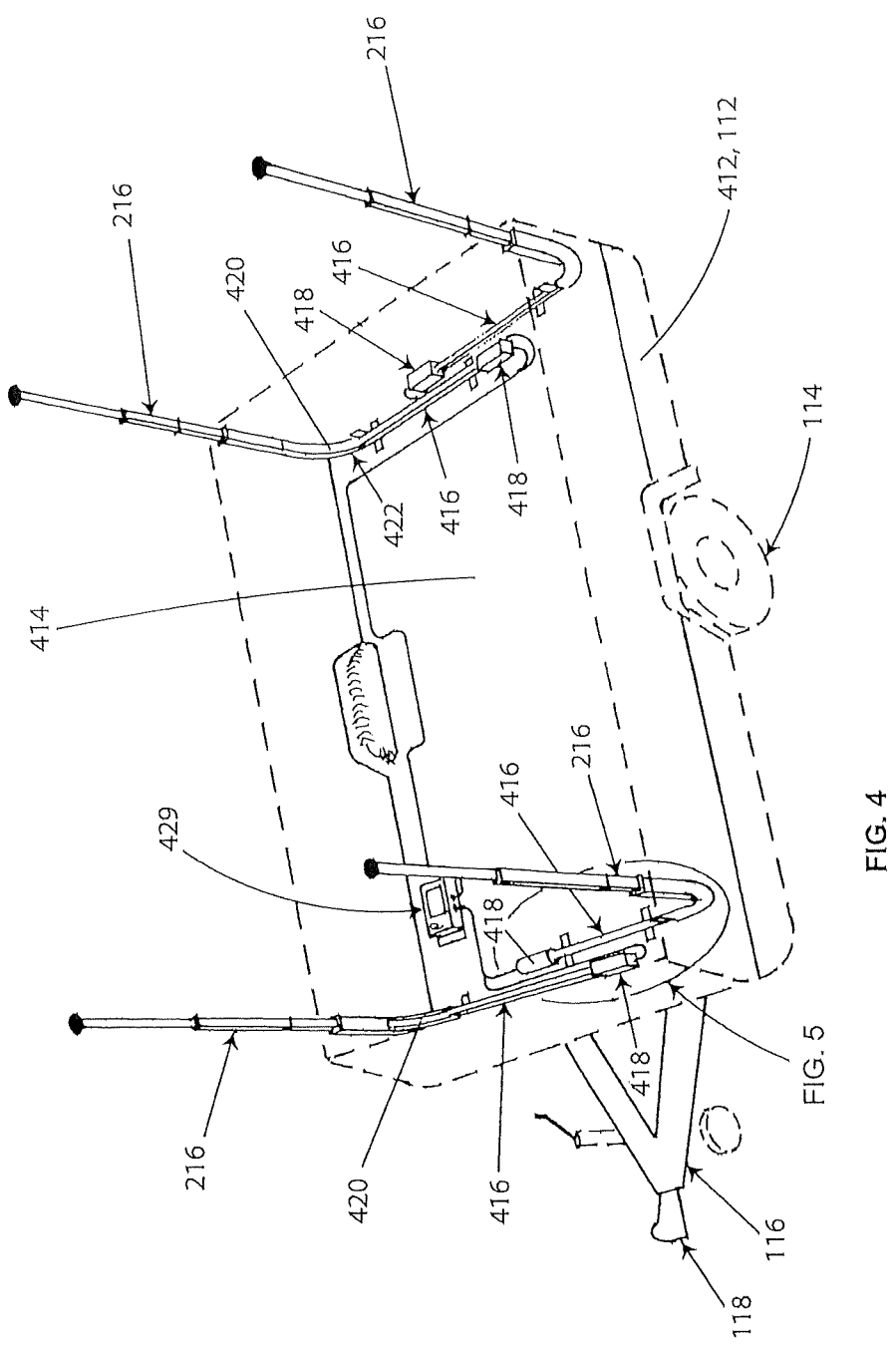
FIG. 4 shows a partially cut away perspective view of a camper trailer with a lift system according to one example of invention fitted thereto.

One particular example of an actuator and associated lift system when implement for the roof of a camper trailer is now described with reference to FIGS. 4 to 6. FIG. 4 is a schematic of a perspective, cutaway view of the base 412 of a camper trailer. The sides of the camper trailer base 412 are shown in dashed outline. The roof of the camper trailer, internal cabinetry, storage units and the like within the base 112 are not shown. Secured to a floor 414 and/or chassis of the base 412 are four compact actuator assemblies 416, each compact actuator assembly 416 having an electric motor 418 coupled thereto. Each of the compact actuator assembly 416 configured to raise and lower a telescopic post 216 via a flexible pushrod 420 running in a curved guide 422.

A control unit 424 is also shown in FIG. 4, installed in the base 412. The control unit 424 is connected to each of the compact actuators 416 and motors 418 by power and signal cables 426. It will be readily appreciated that the control unit 424 and the cables 426 may be located and run in the base 412 as is convenient for particular design of a camper trailer. The control unit 424 may be controlled by a remote control unit located conveniently about the camper trailer. Alternatively or in addition a wireless remote control may be realised via a software application program, "APP", on a user's smartphone or cell telephone wirelessly interfacing to the control unit 424. Further functions and control of the control unit 424 are described further below.

Figure 5:
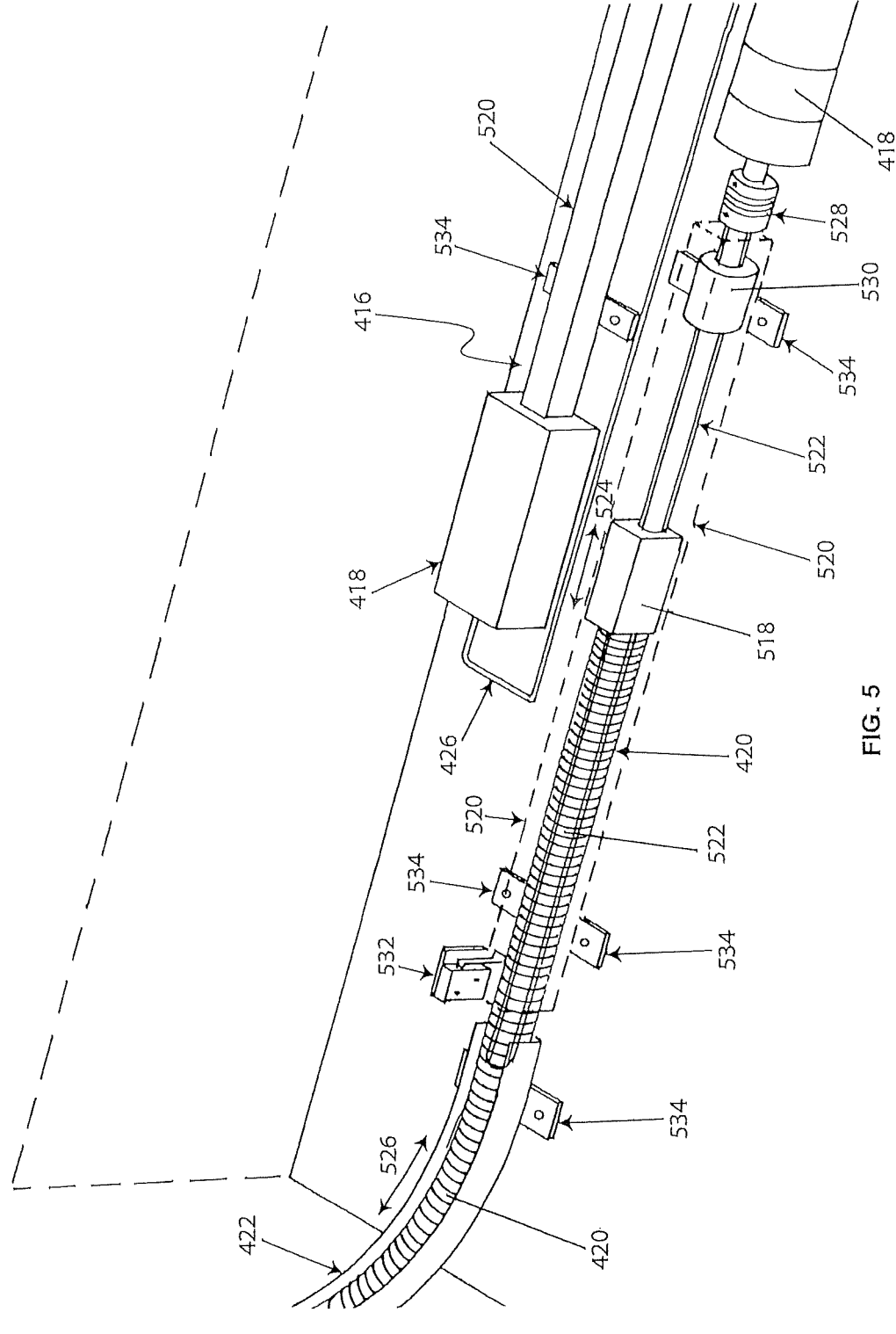
FIG. 5 is an enlargement of the area circled in FIG. 4.

FIG. 5 is an enlarged view of the circled region in FIG. 4. The lower, compact actuator 516 is shown in partial cutaway. As shown, the flexible pushrod 420 for raising and lowering the telescopic posts 216 runs from the curved guide 422 into the compact actuator assembly 516, 416 to abut a sliding block 518. The sliding block 518 moves within a tube 520 which is shown in dashed outline for the lower compact actuator 516. A threaded shaft 522 rotates within a longitudinal bore of the sliding block 518. The longitudinal bore in the sliding block has a corresponding engaging thread to the threaded shaft such that as the shaft 522 rotates the sliding block moves along the tube 520 in the direction of the arrows 524. When the sliding block 518 moves the abutting flexible pushrod 420 also moves in a corresponding direction, as indicated by arrows 526, in order to raise and lower the telescopic posts 216 and the camper trailer roof 122 as desired.

A proximal end of the shaft 522 is shown in FIG. 5 connected to the motor 418 by a flexible coupler 528. The motor 418 may be operated by the control unit 424 to rotate the shaft 522 in order to cause the sliding block 518 to move the abutting flexible pushrod 420 to extend from the distal end of the tube 520 or retract into the tube 520 as desired in order to respectively raise or lower the roof 122.

In FIG. 5, the flexible pushrod 420 is shown as a helical spring 420. The helical spring 420 is implemented with the compact actuator to sleeve the shaft 522 in order for the proximal end of the helical spring 420 to abut the sliding block at all times during operation. The flexible pushrod 420 is maintained in contact with the sliding block by the weight of the roof 122 bearing down on the distal end of the flexible pushrod 420 at the distal end of the telescopic posts 216. Advantageously the proximal end of the flexible pushrod 420 is not fixed to the end of the sliding block 518 in order to avoid damage should part of the roof 122 be prevented from moving freely when lowering the roof 122 to the body 112 of the camper trailer 110. For example the roof 122 may be accidently restrained by awning poles, standing items within the camper trailer or snagged by tree branches.

At the proximal end of the shaft, adjacent the flexible coupler 528, an optional rubber bump stop 530 may be used to prevent the sliding block 518 inadvertently hitting the proximal end of the tube 520 or the flexible coupler 528.

At the distal, opposing end of the tube 520 and shaft 522 a limit switch 532 may be used to prevent the roof 122 being raised beyond the elastic limit of the fabric walls 214, as sensed and controlled by the control unit 424. The limit switch 532 may also be used to set a zero point or reset location for the motor 418 driving the sliding block 518 and consequently the location of the extension of flexible pushrod 422 and telescopic posts 216 raising the roof 122. For example a standard length of compact actuator may be used to raise a range of roof heights 314 depending on a make of a camper trailer. That is the compact actuator 416 may be controlled by the control unit 424 to have a stroke length as driven by the motor 418 that is appropriate for a particular roof height 314 for a type of camper trailer. It will be readily appreciated that the flexible pushrod 420 length may be adjusted appropriately depending on the make of a camper trailer.

The tube 520 enclosing the sliding block 518 has an internal, transverse cross-sectional shape that corresponds in part at least to the transverse cross-sectional shape of the sliding block in order to prevent rotation of sliding block 518 as it is driven by shaft 522. In the example shown of FIG. 5 the tube 520 has a square cross-section that corresponds to the transverse cross-section of the sliding block 518, which is rectangular prism shaped. Accordingly the sliding block is shaped to fit the internal dimensions of the tube. In some forms, the longitudinal edges may be chamfered. It will be readily appreciated that the sliding block 518 or tube 520 need not have a square section as long as a corresponding side wall or edge of each engages in order to prevent rotation of the sliding block 518. Similarly a projection with a corresponding recess may be used between the sliding block and the tube internal wall, to limit rotation of the sliding block.

Enclosing the shaft 522 with the sliding block in the tube 520 has the further advantage of preventing the shaft bending transversely too much under load. A bending of the shaft 522 is undesirable as increased friction and/or binding of the moving surfaces and threads may result. In addition excessive, prolonged bending of the shaft may result in collapsing or buckling of the thread from excessive sideways movement of the shaft 522.

FIG. 5 also shows two mountings/brackets 534 for the tube 520 of the compact actuator 416, 516. The tube mountings 534 are used to rigidly secure the compact actuator assembly 416 to the floor or chassis of the trailer base 112.

Figure 6A:
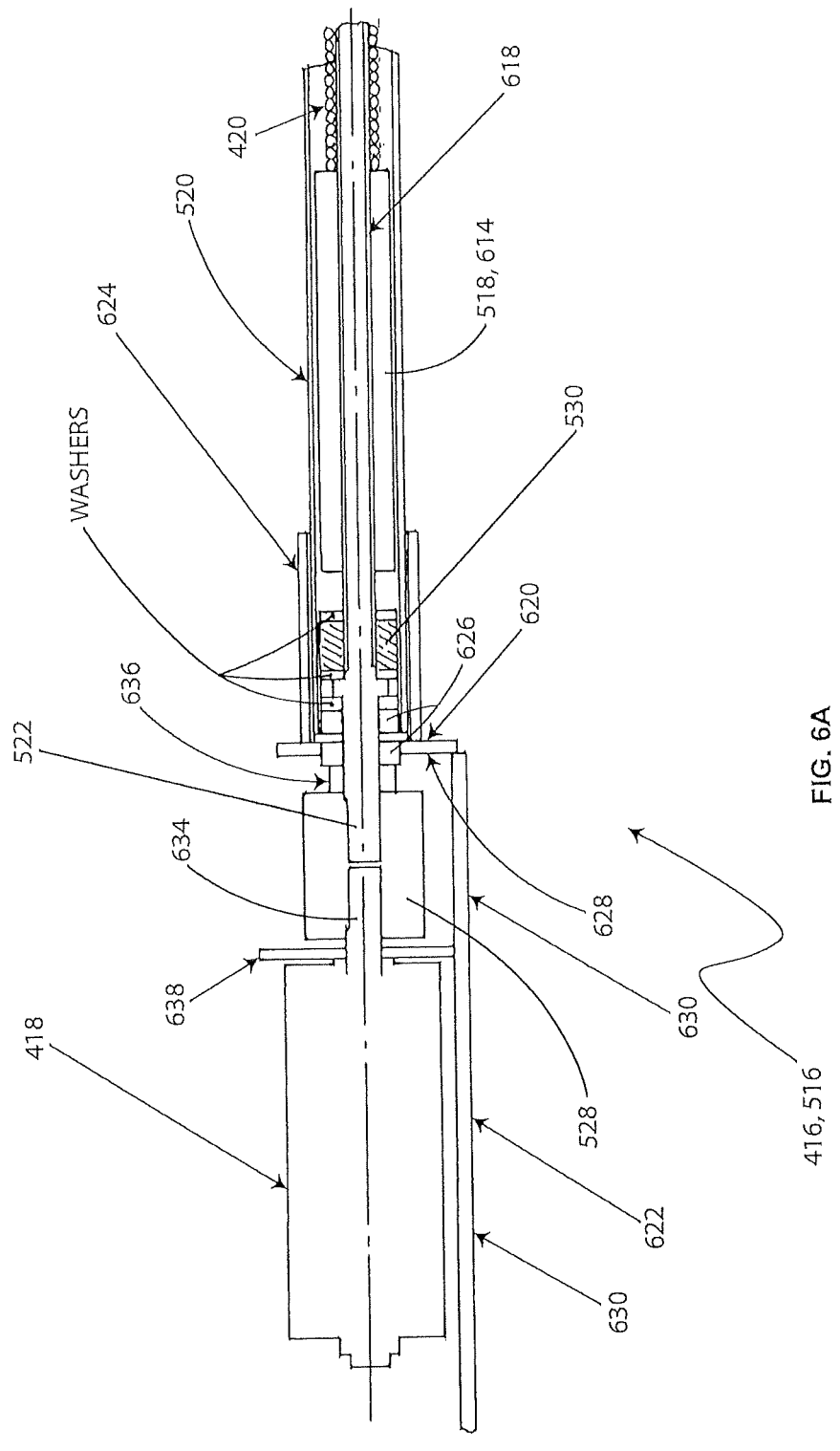
FIG. 6A is a longitudinal cross sectional view of the proximal end of an actuator according to one example of the invention.
Figure 6B:
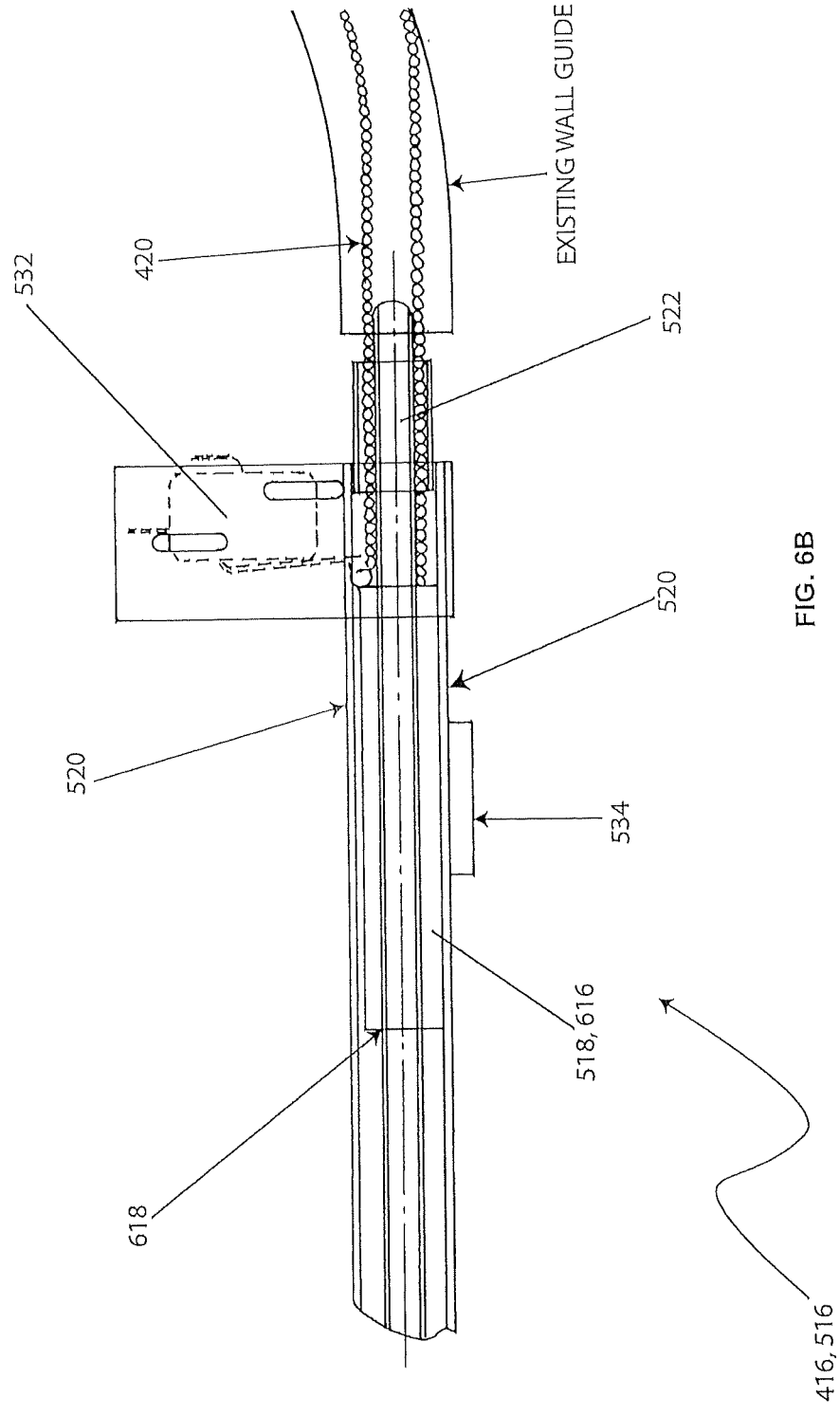
FIG. 6B is a longitudinal cross section view of the distal end of an actuator according to one example of the invention.
Figure 7:
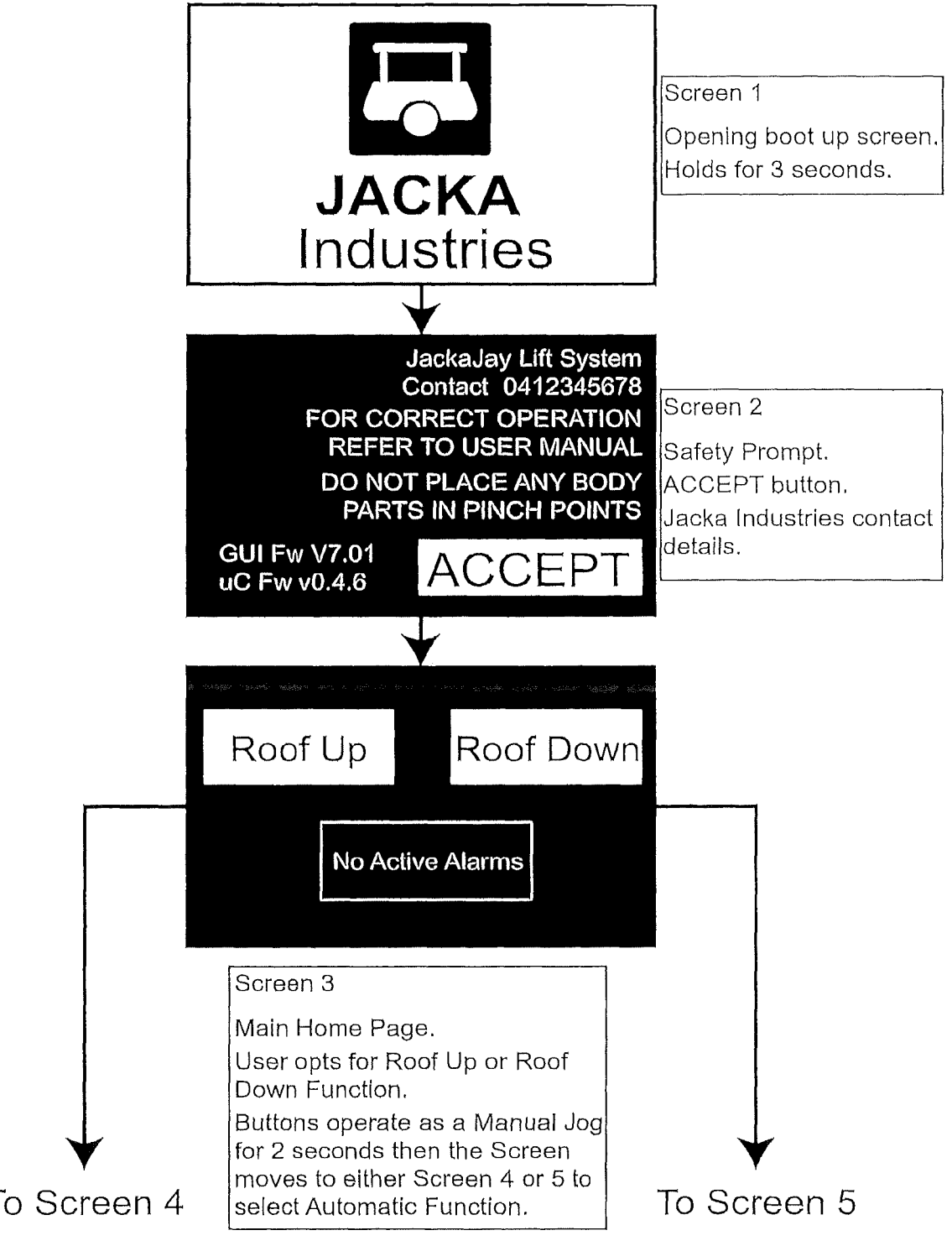
FIG. 7 is an example software application story board for a controlling the lift system according to one example.
Figure 7:
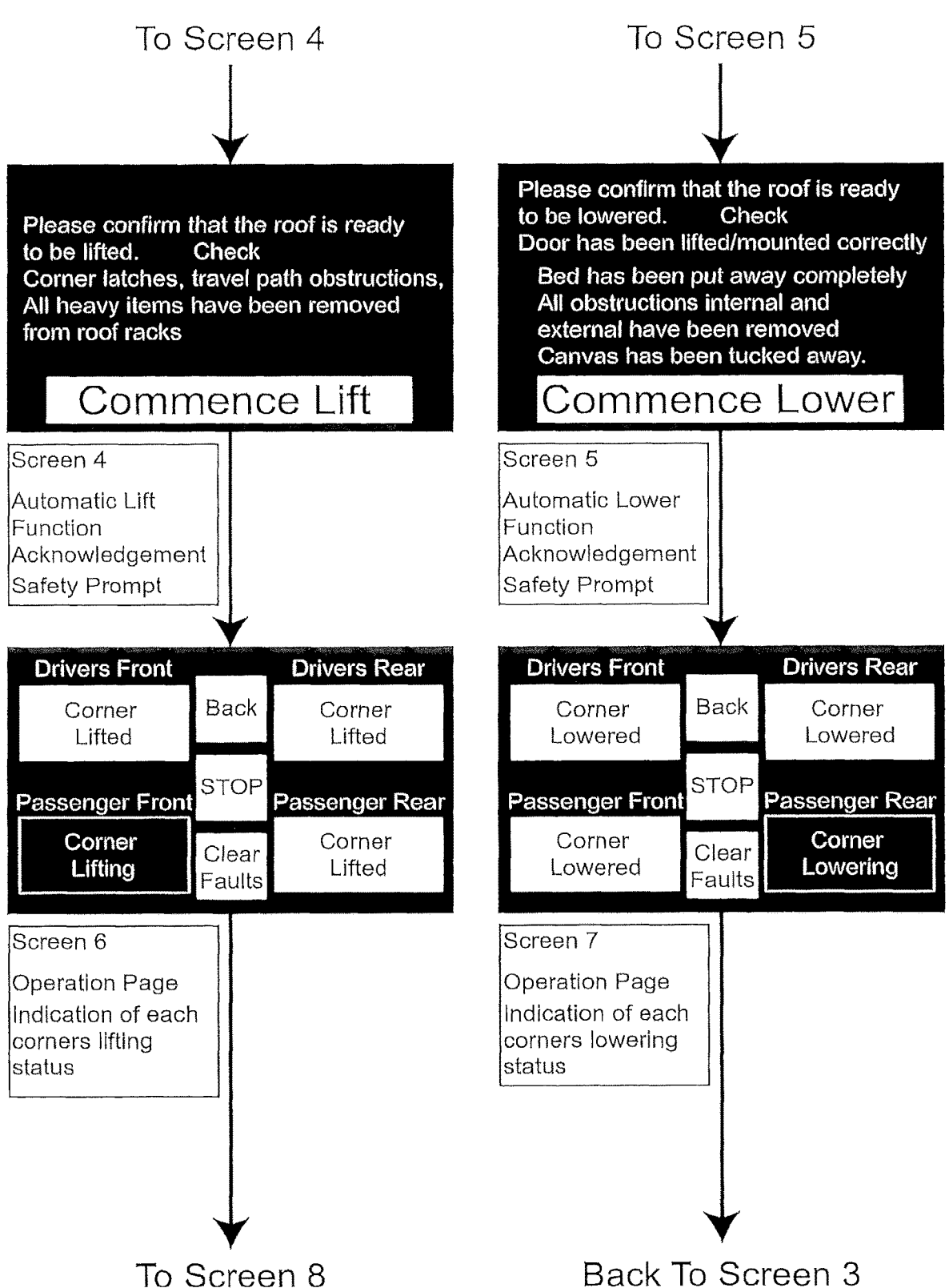
Figure 7:
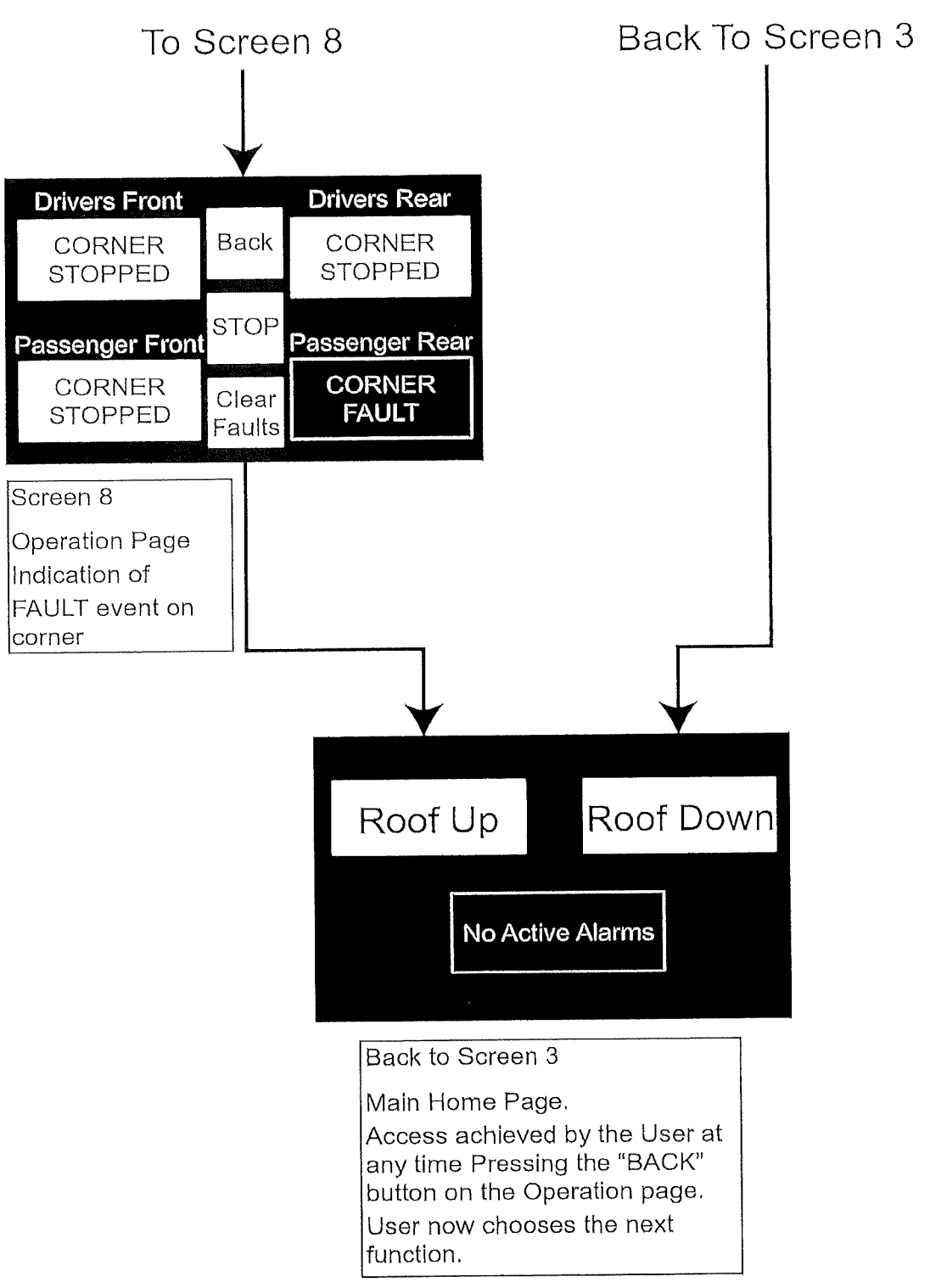

FIGS. 6A and 6B are schematics of a longitudinal cross-section of proximal and distal ends of the compact actuator 416. FIG. 6A shows proximal end, with sliding block 518 in the retracted positon, whilst FIG. 6B shows distal end, with sliding block in the extended position. It will be appreciated that the sliding block 518 as shown in FIGS. 6A and 6B are more elongate, relative to the transverse cross-section of the tube 520, to that shown in FIG. 5. This is an advantage to reducing binding within the tube 520 under load. Under load, the driving shaft may bend transversely slightly and apply a sideways force to the sliding block 518 to push the sliding block against a tube wall.

The thread selected for the shaft 522 and the longitudinal bore 618 of the sliding block is a self-locking thread that limits rotation of the shaft 522 under axial load when not driven by the motor 418. That is, the threads of the sliding block and the shaft form a self-locking arrangement when the motor is not powered. This arrangement of the trapezoidal threads allows the telescopic posts holding the raised roof to be secured in position by the compact actuator without the use of a brake with the compact actuator or safety struts. This is an advantage in that motor is not required to be continuously energised to maintain the roof 122 in the raised position 616, 314 nor a cumbersome brake device to be used with the compact actuator 416 or the motor 418, nor the use of safety struts.

In one example, the thread is a trapezoidal thread with the specifications of a single start, right hand thread with a 2.5 mm pitch to a 7.5 mm outside diameter shaft 522. The thread is typically selected to take into account the correct lift speed without ripping or tearing the side walls and/or plastic windows, the safety of the operation, and the required locking/braking action.

In FIG. 6A, the motor 418 is shown flexibly coupled to the compact actuator 416 and trailer base 412, whilst the compact actuator is rigidly secured to the trailer base 412, 414. The base plate of the motor mount 622 is typically mounted to the floor/chassis of the camper trailer with 4 bolts. This bears the whole load of the roof weight. The mounts 534 on the tube 520 stabilise the tube 520 if something or someone attempts to lift or tamper with the tube 520, or if the flexible 420 pushrod buckles out of the corner.

A camper trailer roof 122 of approximately 100 kg to 300 kg or more may apply a substantial axial thrust through the flexible pushrod 420 to the sliding block 518 and then to the shaft 522. Advantageously the electric motor 418 has been inventively coupled to the drive shaft 522 and flexibly mounted to the camper trailer base 112 such that the substantial axial thrust from the roof 122 is de-coupled from the motor shaft. Accordingly the motor need only be selected on the basis of sufficient torque and power rather than axial thrust load. Furthermore, failure of the motor bearings due to varying and at times substantial axial thrust is removed.

As shown in FIG. 6A the proximal end 620 of the tube 520, that is adjacent to motor 418, is rigidly supported and secured to the floor or chassis 414 of the trailer by the tube mountings 534 and a motor mounting assembly 622. The tube proximal end 620 may be further strengthened and supported by a boot or cap 624. The rotating shaft 522 of the compact actuator is supported and restrained by axial bearings 626 mounted in the proximal end 620 of the tube 522. Preferably two axial bearings 626 are used substantially comprising of stainless steel alloy 316 and rated to bear the axial loads from the roof over many cycles of raising and lowering the roof 122. A vertical end plate 628 to the motor mounting assembly 622 and the tube proximal end 620 is rigidly joined to a bottom plate 630 of the motor mounting 622.

A flexible coupler 528 may be used to couple the proximal end of the driving shaft 522 to the motor axle 634. The flexible coupler 528 may bend transversely from the longitudinal axis as well as in compression and tension along the longitudinal axis. The flexible coupler 528 may comprise of a sleeve with multiple, partial circumferential slots of a depth approximating a radius of the outer circumference of the sleeve. Successive slots along the length of the sleeve may be spaced apart in the longitudinal direction and angularly about the circumference or longitudinal axis to provide the required level of flexibility. In other forms, the flexible coupler 528 may instead be a "Plum coupler".

The flexible coupler 528 may be secured to the motor axle 634 and driving shaft 522 by suitable grub screws and notches in the motor axle 634 and shaft 522, for example. An optional locking collar 636 may also be secured adjacent to the flexible coupler 528 on the shaft 522.

The motor 418 may be flexibly mounted to the bottom plate 630 of the motor mounting assembly 622 by a flexible metal sheet 638 as shown in FIG. 6 for one example of a flexible mounting means. The motor 418 open axle end may be mounted to a face of the thin metal sheet 638. A lower edge of the flexible sheet 638 may then be welded to the bottom plate 630. A flexible mounting means 638 is thus provided by a flexing between the welded lower edge of the metal sheet 638 and the face mounting of the motor 418.

The motor 418 is typically powered by 12 volts with a compact planetary gear reduction to reduce a rotational speed and increase torque. A power supply to the control unit 424 and the motors 418 of the compact actuators 416 may be a conventional 12 volt battery common in vehicle and/or camping use and located with the camper trailer as convenient. Alternatively or in addition the towing vehicle may supply the power supply via the indicator, stop lights and auxiliary wiring circuit typically present in trailers. In other forms, the invention may incorporate a small 30 amp hour battery and/or a 240V inverter for users that do not have a battery in their trailer and/or may be concerned about using their car power supply.

In one example, for a 12 volt system, the current draw may be less than 10 amperes in order to be suitable for powering by the towing vehicle. The selection of the shaft 522 thread pitch and other parameters together with motor choice may allow for the compact actuator 416 and motor 418 to draw preferably less than 4 amperes compared with up to 25 amperes for motors used to drive other lift systems for camper trailers 110, 310. Furthermore, as a damage protection mechanism, if any individual motor 418 experiences a current draw of 5 amps, all motors 418 will stop within a maximum of 50 microseconds. Typically, for lowering of the roof 122 each motor 418 would draw less than 0.5 amps.

A further advantage of the compact actuator 416 is its very compact transverse cross-sectional size and elongate shape for camper trailers 110, 310. The actuator assembly 416 and in particular tube 520 portion thereof is designed to be more streamlined than prior art cable systems, which are can be difficult to remove due to welded mounts and pulleys. In typical examples of installation, the tube portion 520 can be slid into position without catching on, or damaging cabinetry. Brackets 534 are fitted over the tube 520 in an appropriate position then fastened to the floor of the camper trailer. The motor assembly is then slid into the coupler and the grub screws tightened up. The motor assembly is compact and is not problematic to gain access with existing cabinetry. Typically, in the case of retrofitting, the combination of all these components takes up no more space than the tube components of the older cable system that is to be replaced. It will be appreciated that compactness is very important for compressed environments, such as a camper trailer, where every inch of space is important.

It will also be appreciated that the larger and longer the tube size, the more difficult it is to install. One sizing factor to be considered is the outside diameter of the flexible pushrod/spring 420. This is because it has to fit inside the second stage of the telescoping legs in order to lift the final stage of the roof raising process. Typically, a flexible push rod 420 with an outside diameter of between 13 to 14 mm is suitable. In one example, the outside diameter is 13.8 mm.

If the outside diameter of the flexible pushrod is too large (e.g. 20 mm) it may be hard to bend it through the 90 degree of the corner at the base of the wall, especially within the radius of the corner (typically 150 mm). To allow this, the tube 520 would require a larger side wall (e.g. 25 mm or greater) to accommodate the larger outside diameter of the flexible pushrod. In such large assembly examples, a threaded shaft of up to 14 mm diameter could be used, to lift the roof, if coupled with a strong enough motor. Whilst implementing these larger assemblies may be possible, due to space requirements they are typically more difficult to install and the cost per unit increase dramatically as each component would typically need to be custom made.

In one example, typical dimensions of the actuators as described herein may be as follows. An overall length of the compact actuator assembly 416 with motor 418 may be approximately 1,470 mm. The threaded length of the shaft 522 may be approximately 1,300 mm. The sliding block 518 may be approximately 80 mm long, accordingly the stroke length of this example compact actuator may be approximately 1,200 mm.

The tube 520 transverse cross-section typically has a square footprint with a side length in the approximate range of 20 to 25 mm. It will be readily appreciated that a range of 20 to 40 mm may be used depending on the dimensions and gauge of the helical spring/flexible pushrod 420 as well as the sliding block 518 dimensions. In one example, an aspect ratio for the sliding block 518 length to the internal transverse cross-sectional footprint side length of the tube 520 is 4.7, ranging from about 4 to 5.

The maximum transverse cross-sectional footprint of the compact actuator 416 and motor 418, are the motor 418 outside diameter and a projection above the tube 520 by the limit switch 532. The transverse cross-sectional footprint along the length of the compact actuator 416 and motor 418 may typically range, if considering a square footprint, from having side length of about 25 mm to 65 mm. Such small cross-sectional footprints allow the compact actuator assembly 416 and integral motor 418 to be installed in existing camper trailers without modification of existing structures in the trailer base. For example without modifications to storage units, bed/s, cabinets and the like internal fixtures or structures. This is due to the design being more compact, flexible and the fact that the actuator assembly 416 and the motor assembly 418 being separable.

It will be readily appreciated that the dimensions and aspects ratios, given by way of example, and may be varied without departing from the invention. The compact actuator has further aspects which make it a uniquely and inventively compact lift system arrangement. For example, the use of the flexible pushrod 420 which sleeves over the drive shaft 522 distal end allows for a stroke length or raising height 314 that may only constrained by the length or width of the camper trailer base 112.

Advantageously, when compared to cable systems, the compact actuator 416 is driven by a co-located electric motor 418, so the compact actuator lift system 416, 418 may be installed in a variety of positions in the camper trailer base 112 to suit the particular camper trailer construction, the stroke or raising height 314 required and/or the location of the telescopic posts 216 for the roof 122.

The compact actuator lift system 416, 418 may be installed longitudinally, width wise or diagonally with respect to the camper trailer base 112. By way of example, modern camper trailers 110 may have a base 112 of dimensions which may provide ample opportunities at the floor 414 of the base 112 for mounting the compact actuator lift system 416, 418. Body lengths of camper trailers can vary from 2.5 m to 5 m and widths can vary from 1.8 m to 2.3 m. Accordingly, the compact actuator may be more easily and flexibly installed during camper trailer manufacture. Such flexibility in relation to installation location is not available for cable based systems as the cable arrangement about the base of camper trailer constrains how and where the cables run and how the cable driven actuators may be located and accessed in the base of the camper trailer. Due to available storage space being limited in camper trailers it is common to see damage caused by items caught in pulleys, such as shopping bags, towels and items of clothing that have been jammed into storage cabinets without realising that exposed cables and pulleys are mounted and moving through that storage area.

As would be appreciated, the compact actuator lift system 416, 418 may be retrofitted in place of the cable driven actuators in common use by some camper trailer manufacturers. The components and construction of the compact actuator lift system 416, 418 and associated control unit 424 make a cost of retrofitting comparable to repairing prior art actuators such as cable driven systems. The ease of a retrofitting installation of the compact actuator lift system to a common cable driven actuator systems may be a day or less for a person skilled in the art. By way of example, access to the floor 414 of the camper trailer base 112 may be via existing removable panels and cabinetry. For retrofitting a lift system it is an advantageous to minimally disturb existing storage units, beds and cabinets within the trailer base 112. Existing structures such as interlocking support legs in the base 112 of some camper trailers may not disturbed.

Locating the compact actuator lift system 416, 418 within the trailer base 112 advantageously protects them from the elements and as thrown up from the road during travelling. This is in contrast to cable lift systems such as shown in U.S. Pat. Nos. 3,314,715 and 3,507,535 where the cable arrangements are located within and under the chassis of the trailer base 112.

In addition locating compact actuator lift system 416, 418 within the trailer base 112 further reduces the minimal noise of the low power motors 418. The further noise reduction is of a particular advantage when arriving late at night at a camping site and setting up. Fellow campers are not disturbed by the raising of the camper trailer roof.

The control unit 424 may also be programmed and interfaced with sensors to protect the compact actuator lift system and the roof and walls from damage as well as to provide failsafe features. For example to sensing when the roof has been sufficiently raised by the number of motor revolutions of the shaft engaged with the sliding block. The speed of the roof raising and lowering may also be selected to be appropriate to prevent damage to the fabric and/or flexible plastic composite walls. In one example, the motor/planetary gearbox combination 418 combined with actuator assembly 416 is designed to take about 2 minutes 40 seconds to carry out lift operation and about 2 minutes for lowering operation. This allows the operator to walk around the camper trailer several times, at a leisurely pace, to ensure that canvas walls and/or windows are unfolding correctly as if they are caught or twisted it may cause expensive damage. Likewise, on the lowering operation, the operator can walk around at a leisurely pace and continuously tuck the canvas walls and plastic windows into the body of the camper trailer.

The sensing may also include detecting when the roof securing clips 124 have inadvertently not been unlocked before raising or there is an obstruction to the full raising of the roof, for example a tree branch. An example of the sensing to roof raising restraints may be to motor current draw, revolutions of the motor and strain sensors. In one example, the sensors are designed to stop all motors if 5 amps of current is drawn by any one motor during lifting operation and if 1.5 amps of current is drawn during lowering operation.

Raising/lowering operation of the roof is typically carried out by pressing buttons and/or a touch screen of a user interface.

Typical operation steps in a roof raising operation according to one example are as follows. The system is powered on by typically pressing a Power Button on a remote control/user interface. Remote control/User interface may be located for example in a storage compartment. A touch screen will turn on. A user will then touch raise roof 'button' on touch screen, typically for 2 seconds. The four motors of the actuators will rotate their respective threaded shafts, and the nut/sliders will move linearly inside the tube guides.

If a roof securing clamp is not released, this is detected by the control unit and all the motors stop before damage occurs, and reverse for 2 seconds to relieve pressure. The operator can then release the clamp(s) before recommencing the lifting operation. It will be appreciated that a similar process will occur if there is any other obstacle or resistance encountered during a lift operation.

Respective nuts/sliders move the flexible pushrods/ springs out of the tube guides and through curved guides (typically 90° elbow) into the largest segment of collapsed telescopic legs (roof supports) at each corner of the trailer. The flexible pushrod/spring raise the roof of the camper trailer by forcing the collapsed legs vertically until they are fully extended. When the roof raises to the correct height, limit switches at the end of each linear tube guide will be engaged by the slide/nut, stopping each motor independently.

FIG. 8 shows an example software application story board for controlling the lift system.

In this specification, terms denoting direction, such as vertical, up, down, left, right etc. or rotation, should be taken to refer to the directions or rotations relative to the corresponding drawing rather than to absolute directions or rotations unless the context require otherwise.

What is claimed is:

1. An actuator assembly suitable for use in a lift system for a roof of a camper trailer, the actuator assembly comprising:
  a linear guide tube portion;
  a rotatable threaded shaft that extends within and in alignment with the linear guide tube portion; and
  a motor which when installed is coupled to the shaft and configured to rotate the shaft;
  a slider located in the linear guide tube portion, and threadably mounted to the shaft,
  the slider prohibited from substantial rotation within the linear guide tube portion about an elongate axis thereof, such that, on rotation of the shaft, the slider moves along the shaft; and a flexible push rod configured to sleeve the shaft when installed, wherein one end of the flexible push rod is arranged for contacting engagement with a distal end of the slider, and the other end of the flexible push rod is operatively engageable with a roof support when in use.

2. The actuator assembly of claim 1, wherein the tube has a rectangular cross section.

3. The actuator assembly of claim 2, wherein the slider engages with an internal portion of the guide to prohibit substantial rotation therein.

4. The actuator assembly of claim 3, wherein the slider is substantially block shaped.

5. The actuator assembly of claim 4, wherein the slider is substantially rectangular prism shaped.

6. The actuator assembly of claim 5, wherein the ratio of slider length to shaft length is 1:X, where X is in the range of 13 to 14 inclusive.

7. The actuator assembly of claim 5, wherein threaded engagement between the slider and shaft is self-locking, such that, in the absence of rotation of the shaft, the slider maintains its position along the length of the guide.

8. The actuator assembly of claim 7, wherein the shaft thread is a trapezoidal thread.

9. The actuator assembly of claim 1, wherein the flexible pushrod is a helical spring which sleeves the shaft.

10. The actuator assembly of claim 1, including a curved guide extending from a distal end of the linear guide, the flexible pushrod extending therein.

11. The actuator assembly of claim 9, wherein the motor includes a motor axle operatively connected to the shaft, the motor axle and the shaft being axially aligned.

12. The actuator assembly of claim 11, including a flexible coupler operatively connected between the motor axle and the shaft.

* * * * *